Dec. 29, 1964　　　　P. G. HYKES　　　　3,162,950
METHOD AND MEANS FOR TRAILER AXLE ALIGNMENT
Filed Dec. 21, 1961　　　　　　　　　　　　3 Sheets-Sheet 1

INVENTOR.
Paul G. Hykes.
BY
John B. Sowell
ATTORNEY

Dec. 29, 1964 P. G. HYKES 3,162,950
METHOD AND MEANS FOR TRAILER AXLE ALIGNMENT
Filed Dec. 21, 1961 3 Sheets-Sheet 2

INVENTOR.
Paul G. Hykes.
BY John B. Sowell
ATTORNEY

Dec. 29, 1964 P. G. HYKES 3,162,950
METHOD AND MEANS FOR TRAILER AXLE ALIGNMENT
Filed Dec. 21, 1961 3 Sheets-Sheet 3
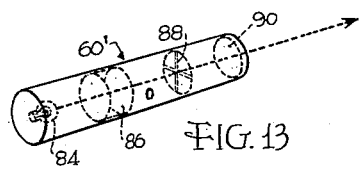
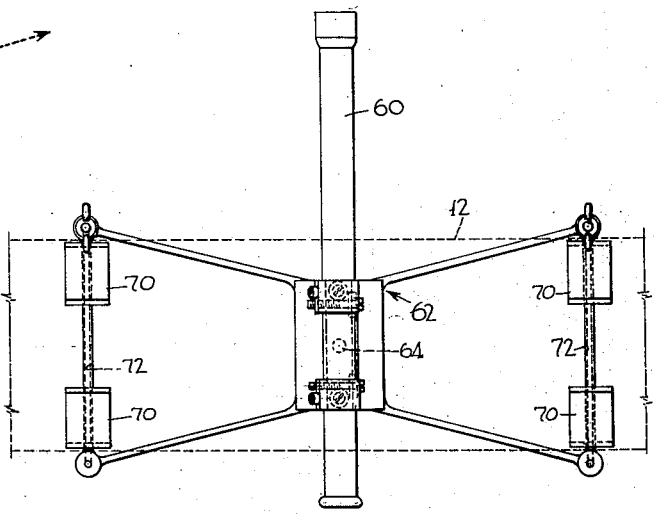
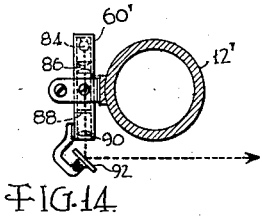
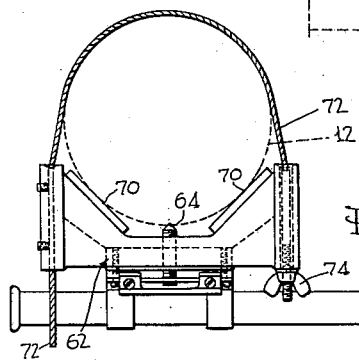
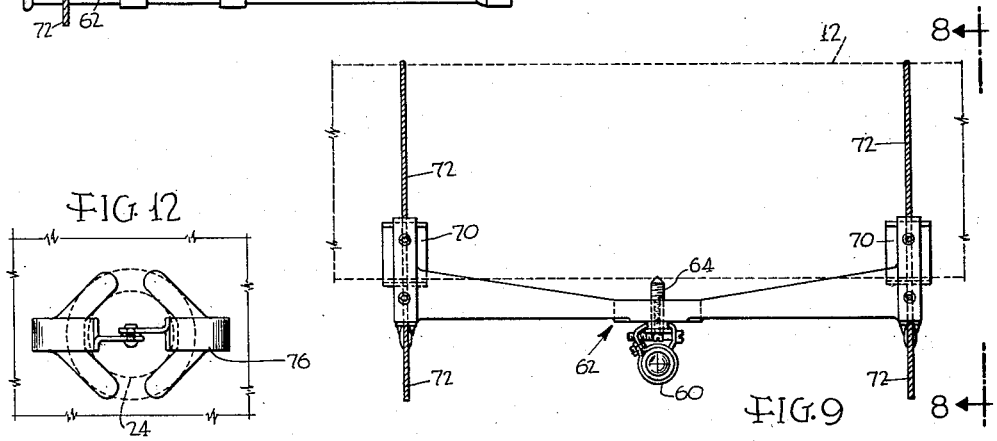
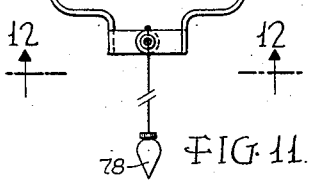
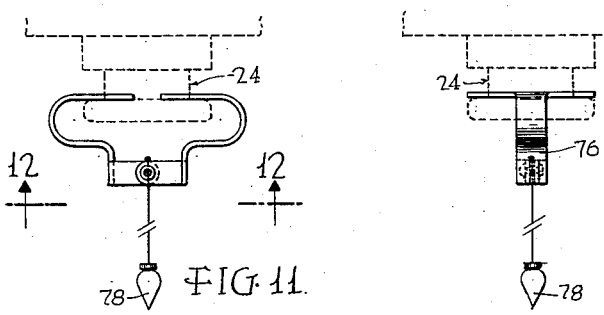
INVENTOR.
Paul G. Hykes.
BY
John B Sowell
ATTORNEY

United States Patent Office 3,162,950
Patented Dec. 29, 1964

3,162,950
METHOD AND MEANS FOR TRAILER AXLE ALIGNMENT
Paul G. Hykes, Grosse Pointe, Mich., assignor to The Budd Company, Philadelphia, Pa., a corporation of Pennsylvania
Filed Dec. 21, 1961, Ser. No. 160,977
5 Claims. (Cl. 33—46)

The object of this invention is to provide an improved wheel axial alignment device and a method of aligning trailer axles.

Heretofore the correct alignment of wheel axles of truck trailers could not be performed by portable equipment and required expensive test bed equipment. Not only is the test bed alignment equipment expensive but is slow and requires a series of trial and error adjustments.

A large portion of the truck trailers on the highways are aligned by measuring from a point on the center of the axles to the center line of the king pin. This method has not proven satisfactory for the accuracy of such a crude method leaves something to be desired.

Misalignment of truck wheel axles is one of the major reasons for excessive tire wear. I have discovered a new method and means of aligning trailer wheel axles which eliminates errors incurred in other forms of wheel alignment.

The primary object of the present invention is to provide improved portable means for aligning truck wheel axles.

Another object is to provide means for aligning the center of a floating wheel axle of a trailer in perpendicular alignment with the king pin.

Another object is to provide an optical device for aligning wheel axles.

Another object is to provide a pantograph caliper for locating the midpoint of wheel axles and providing correct alignment of an optical device affixed thereto.

Another object is to provide a simple and accurate method of aligning trailer wheel axles in the field without removing a trailer from service.

Other and more specific objects of the present invention will become apparent in the following detailed description of a preferred embodiment of the alignment means illustrated in the accompanying drawings, wherein:

FIG. 7 is an enlarged plan view of the optical sighting device;

FIG. 8 is a side elevation of the optical sighting device of FIG. 7 showing the device mounted on an axle;

FIG. 9 is a front elevation of the optical sighting device of FIG. 8;

FIG. 10 is a plan view of a king pin clamping device;

FIG. 11 is a front elevation of the clamping device of FIG. 10 showing a plumb bob attached;

FIG. 12 is a side elevation of the clamping device of FIG. 11;

FIG. 13 is a schematic perspective of the optical projecting device;

FIG. 14 is a side elevation of the mounted optical projecting device.

In accordance with the invention the preferred method of practicing the invention is to employ a parallelogram or pantograph caliper which fits over the hub caps and automatically adjusts the center slide bar of the pantograph to a center point between the ends of the axle for marking a center point on the axle; a telescopic sighting device is mounted on the center point so marked and the telescope aligned perpendicular to the axis of the wheel axle; a line of sight through said telescopic sighting device to the center of the king pin may be obtained by adjusting radius rods to align the center line of said telescopic sighting device with the center line of the king pin which provides correct alignment of the wheel axle.

Figure 1:
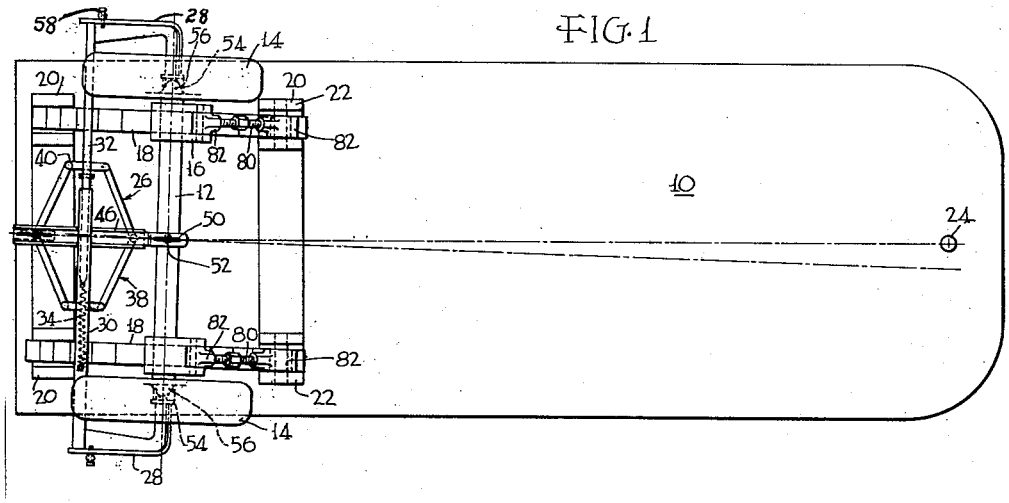
FIG. 1 is a bottom view of a typical truck trailer showing an axle out of alignment with the center line of the trailer.
Figure 2:
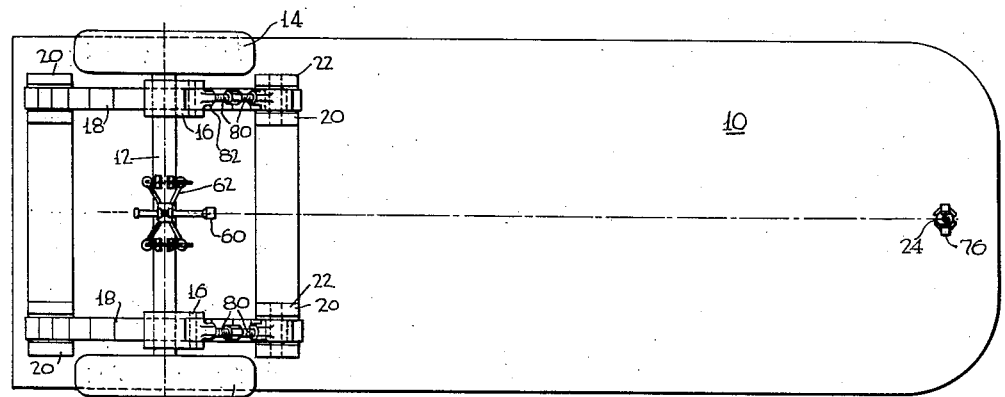
FIG. 2 is a bottom view of a typical truck trailer showing an axle in alignment with the king pin of the trailer.
Figure 3:
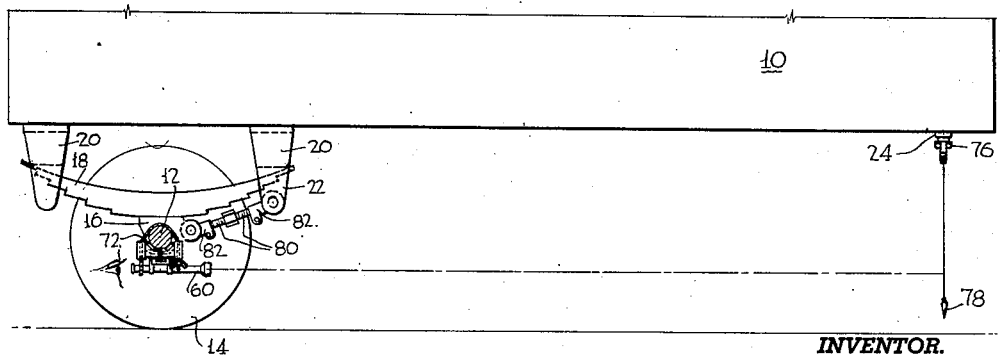
FIG. 3 is a side elevation of a typical truck trailer showing the preferred method of aligning the wheel axle.
Figure 4:
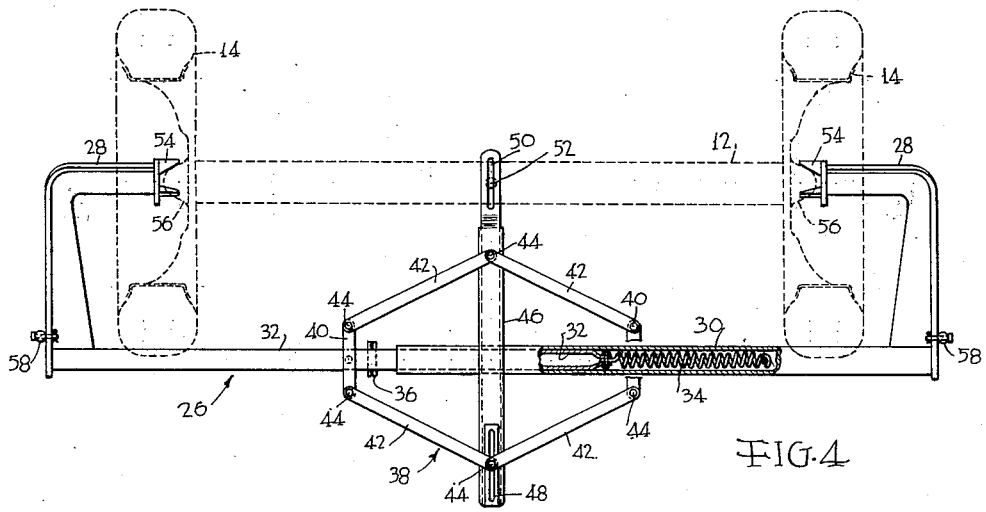
FIG. 4 is an enlarged plan view of the pantograph caliper device for locating the center of wheel axles.
Figure 5:
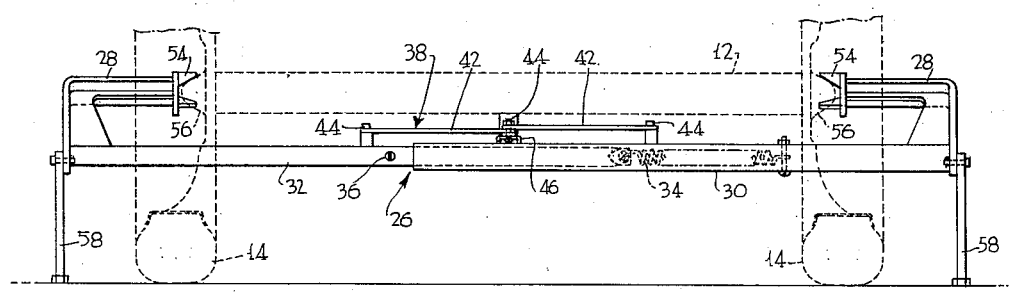
FIG. 5 is an elevation of the pantograph caliper device shown in FIG. 4.

Referring to FIGS. 1 to 3 there is shown a typical trailer 10 having one or more axles 12 for wheels 14. Journal brackets 16 are attached to the axle 12, usually by welding, and the journal bracket 16 is attached to springs 18 by suitable fastening means such as U-bolts. A guide and support bracket 20 is attached to the trailer 10 having a pair of journal arms 22 which serve as a guide for ends of the leaf spring, but allows the axle assembly to float when being towed. A trailer will give least tire wear and optimum performance when the two wheels 14 are connected by an axle center line which is exactly perpendicular to the center line of the trailer, provided however, the center between the two wheels is on the center line of the trailer. The floating springs are not maintained at exact center of the guide and support bracket 20, and the brackets are not equidistant from the center line of the trailer 10. A method which will overcome this problem and give optimum tire wear is to first locate the center point of the axle and then adjust the axle so that a line through the center point of the axle which is perpendicular to the axle axis intersects the center point of the king pin 24.

Since both the method and means described herein are completely new, axle manufacturers do not presently mark the center of their axle housings. In order to locate the center point of the axle 12, which is not so marked, a pantograph caliper 26 shown in FIGS. 1 and 4 to 6 is provided. The device 26 comprises two inwardly turned arms 28 affixed to opposite ends of slidably concentrically mounted tubes 30 and 32. A spring 34 is mounted inside the larger tube and anchored at its ends to the tubes 30 and 32 to urge the slidable tubes to a closed position. A stop pin 36 is provided to prevent the pantograph frame 38 from being damaged or forced out of adjustment. Pantograph frame 38 is held to the tubes 32 and 34 by clamps 40. Arms 42 of the frame are pivoted at points 44, and being of identical effective length, maintain the center slide bar 46 at a point midway between the arms 28 which is perpendicular to the axis of tubes 32 and 34. It can be seen that as the distance between clamps is lessened the arms 42 swing out and away from tubes 32 and 34. One end of the center slide bar has a guide groove 48 for one of the pivots 44 between arms 42; the other pivot between arms 42 may be fixed on slide bar 46. A second slide groove 50 is provided with a prick punch 52 or knife edge to mark the center of the axle. The arms 28 have adaptors 54 mounted thereon to center on any type hub caps 56. Most trailers have high pressure oil retained behind the hub caps and it is preferred not to remove them. One or more of the threaded bolts (not shown) which hold the hub caps may be removed and an adaptor—like adaptor 54—provided to bolt onto the hub cap flange. If the operator desires to remove the hub caps, as required by other alignment devices, an adaptor—like adaptor 54—may be fitted which will clamp into the center holes of the axle, but this has not been found to be necessary to produce desirable results.

Placing the caliper device on similar reference points of the hub caps 56 will determine an exact point of reference relative to the wheels, and the center slide bar 46 will always maintain an exact center between these reference points. A mark may be made with the prick punch device 52 which locates an exact center between these reference points on the axle. In order to facilitate ease of operation of the device two legs 58 are provided on the arms 28 to hold the device in an erect position while the center point is being located.

After the center point is located the optical sighting device shown in FIGS. 2, 3, and 7 to 9 is attached either above or below the axle 12 where the center mark is made, and where a clear line of sight from the axle to the king pin is available. The preferred embodiment illustrated shows the optical sighting device mounted in the lower position which will always provide a clear line of sight to the king pin. As shown in FIG. 8 the optical sighting device comprises an optical telescope 60 which is provided with an adjustable cross hair. This telescopic device may be identical to standard telescopes which are mounted on rifles. Base or mount 62 may be constructed as a hollow or solid block. A centering screw 64 is adjustably mounted through the block and located in the groove made by the prick punch 52. Mount 62 is provided with extended arms 66 which interconnect with side frame pieces 68 carrying seating surfaces 70. When the seating surfaces are mounted flush on the axle and the centering screw is in the center groove the mount may be affixed to the axle by means of threaded cable 72 and wing nuts 74.

Telescope 60 is mounted on a conventional T block by means of a conventional clamp sight mount. If the surface of the axle is smooth, the mount 62 will align the telescope exactly perpendicular to the center line of the axle at a point centered between the wheels. If there is any doubt as to whether the telescope is mounted exactly perpendicular to the axle the scope may be sighted on a target (not shown) which mounts on the slide bar 46 of the caliper 26 while it is affixed to the wheels.

A king pin clamp 76 and plumb bob 78 are provided to locate an exact center of the king pin 24 as shown in FIGS. 10 to 12. Journal bracket 16 (FIGS. 1 to 3) and journal arms 22 are interconnected by conventional heavy duty adjustable radius rods comprising threaded bolts 80 which screw into threaded clamps 82. When the bolt 80 is properly adjusted it pivots one end or the other of the axle to bring the cross hair of the telescope 60 into alignment with the plumb bob string. The telescope 60 and calipers 26 shown will operate to one mil accuracy. The novel device operates on a principle which eliminates error incurred in the off center mounting of the trailer wheels further increasing the alignment accuracy.

Figure 6:
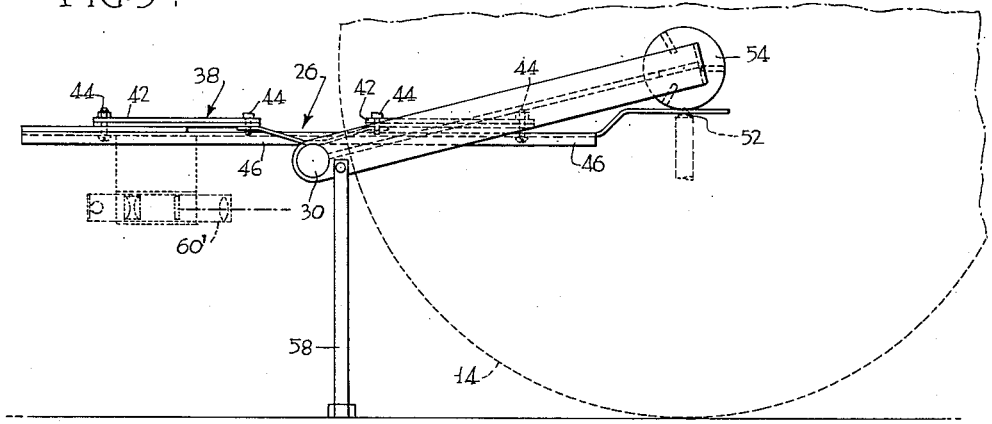
FIG. 6 is a side elevation of the pantograph caliper device shown in FIGS. 4 and 5.

The illustrated caliper and telescope assembly may be combined into a single unit by mounting the caliper on a movable base and/or placing the telescopic sighting device 60 on the centering slide bar 46 as shown in FIG. 6. Such a modification eliminates the need for marking the center of the axle, for the center slide bar is always centered between the wheels, and forms a line which is perpendicular to and centered on the axle.

The optical device illustrated may be employed while the trailer is loaded or unloaded and does not entail a discontinuance of service. It is preferred that the novel device be employed when the trailer is on a level plane, but even this may be overcome by attaching a leveling bubble on the telescopic mount 62 and/or jacking the axle and trailer to a level position. An alternative method is to employ a rigid king pin clamp which will slope with the trailer and axle. A magnetic clamp and rigid thin aluminum tube will produce a suitable target to sight upon if the trailer is not level.

The principle of placing an optical device at the center of the axle perpendicular to the axis of the axle may be enhanced further by employing light reflecting or projecting devices and/or by reversing the sighting position without deviating from the scope of my invention. FIGS. 6, 13 and 14 show an optical projection device 60' which comprises a light source 84 which is supplied with a power source (not shown). Condensing lens 86 projects the light source in parallel rays on the image 88 and the projection lens system 90 projects the image to the target or screen at the king pin. A mirror 92 is shown with a pivot attachment to illustrate that the optical device may be mounted vertically and would not be limited by mounting in a fixed frame or housing for the light rays may be reflected to any desired path.

While the illustrated embodiment has shown the elementary principles of the invention and a preferred method of aligning trailer wheel axles which are not provided with center marks or centering devices on the wheel axles, the invention is not so limited. Manufacturers of wheel axles may provide their axle housing with a standard mounting plate and/or centering marks which would allow direct mounting of an optical device to the axle and insure both centering and perpendicular alignment. Such a modification of trailer wheel axles could be accomplished at very low cost and would reduce the cost of highly precision alignment to an infinitesimal fraction of present day alignment devices. The portable precision alignment device could be incorporated into a single miniature package and reduced to the size of a flashlight or a small sighting device which would mount on the prefabricated standard mounting means.

It is to be understood that either optical device may be located on the axle or on a mount located by a centering device similar to the pantograph caliper, and that either device may be modified by reflection means to facilitate use at any angle. It is accordingly desired that the appended claims be given a broad interpretation commensurate with the scope of the invention within the art.

What I claim is:

1. The method of aligning a misaligned through-axle of an axle assembly of a towed trailer of the type having adjustment means on the axle assembly and a king pin towing device comprising the steps of:

establishing on the axle a physical mark at a center point of said through-axle, affixing a mounting bracket to said through-axle located on said center point of said through-axle, providing a locater surface on said mounting bracket, attaching an optical device to said locater surface on said mounting bracket, said optical device providing an optical line which is directly attached to and perpendicular to the axis of said through-axle and which intersects said center point of said through-axle, and adjusting said adjustment means on the axle assembly to move said optical line to a point of intersection with the center of said king pin of said trailer, thus establishing the alignment of said through-axle independent of the alignment of the wheels or the center line of the trailer.

2. The method of aligning a misaligned through-axle assembly of towed trailers of the type having radius rod adjustment means on the through-axle and a king pin towing device on the trailer comprising the steps of:

locating the center of said through-axle midway between the ends of said through-axle, placing a physical mark on said through-axle at said center, mounting an optical sighting device directly on said through-axle centered on said mark to provide a line of sight of said optical sighting device which is perpendicular to the axis of said through-axle and which intersects the center of said through-axle midway between the ends of said through-axle, and adjusting said radius rod adjustment means to move said through-axle and said optical sighting device mounted thereon until the line of sight of said optical sighting device intersects both the midpoint of said through-axle and the midpoint of said king pin thus aligning said through-axle independent of its location relative to said trailer.

3. The method of aligning a misaligned through-axle of an axle assembly of a towed trailer of the type having adjustment means on the axle assembly and a king pin towing device comprising the steps of:

establishing on the axle a physical mark at the center point of said through-axle, affixing a mounting bracket to said through-axle located on said center point of said through-axle, providing a locater surface on said mounting bracket, attaching an optical light projection device directly to said locater surface on said mounting bracket, said optical light projection device providing a light beam which is perpendicular to the axis of said through-axle and which intersects the center of said through-axle, and adjusting said adjustment means on the axle assembly to move said light beam to a point of intersection with the center of said king pin of said trailer, thus establishing the alignment of said through-axle independent of the alignment of the wheels or the center line of the trailer.

4. A device for aligning the through-axle on the towing point of a trailer comprising the combination:

a mounting bracket, centering means on said mounting bracket adapted to fit onto a center mark provided on the midpoint of said through-axle, attachment means on said mounting bracket for attaching said mounting bracket to the midpoint of said through-axle, a line of sight optical device, connector means connecting said optical device to said mounting bracket, and an adjustment device for movably adjusting said line of sight optical device relative to said mounting bracket, said line of sight optical device being adapted to be mounted and adjusted on said through-axle on said center mark to provide a line of sight perpendicular to and bisecting said through-axle whereby alignment of said through-axle is determined by alignment of said line of sight on the towing point of said trailer.

5. An optical device for indicating and aligning the draft angle of the through-axle of a towed trailer having mounting and centering means permanently affixed at the predetermined midpoint of said through-axle comprising:

a mounting frame adapted to be connected to said mounting and centering means, a guide seating surface on said mounting frame for connecting said mounting frame directly to said mounting and centering means, an optical lens system for enlarging an image and providing an optically accurate line of sight, and attachment means on said mounting frame connecting said optical lens system to said mounting frame and thus to said through-axle, said optical lens system providing an optically accurate line of sight located at the perpendicular bisector of said through-axle whereby said line of sight is an optically accurate indicator of the draft angle of said through-axle permitting its accurate adjustment and alignment.

References Cited by the Examiner

UNITED STATES PATENTS

| | | | |
|---|---|---|---|
| 432,328 | 7/90 | Painter | 33—191 |
| 2,070,518 | 2/37 | Smith | 33—191 |
| 2,301,154 | 11/42 | Tilton | 33—46.2 |
| 2,353,272 | 7/44 | Simmons et al. | 33—46.2 |
| 2,575,194 | 11/51 | Smith | 33—46.2 |
| 2,590,722 | 3/52 | Otis | 33—193 |
| 2,845,718 | 8/58 | Keymer | 33—193 |
| 2,877,560 | 3/59 | Brown et al. | 33—193 |
| 2,936,657 | 5/60 | Berlin et al. | 33—191 X |
| 2,972,189 | 2/61 | Holub | 33—46.2 |
| 2,979,822 | 4/61 | Wilkerson | 33—46 |

FOREIGN PATENTS 496,541  12/38  Great Britain.

ISAAC LISANN, *Primary Examiner.*